G. W. ARPER.
FAUCET FOR OIL CANS.
No. 11,560. Reissued July 28, 1896.
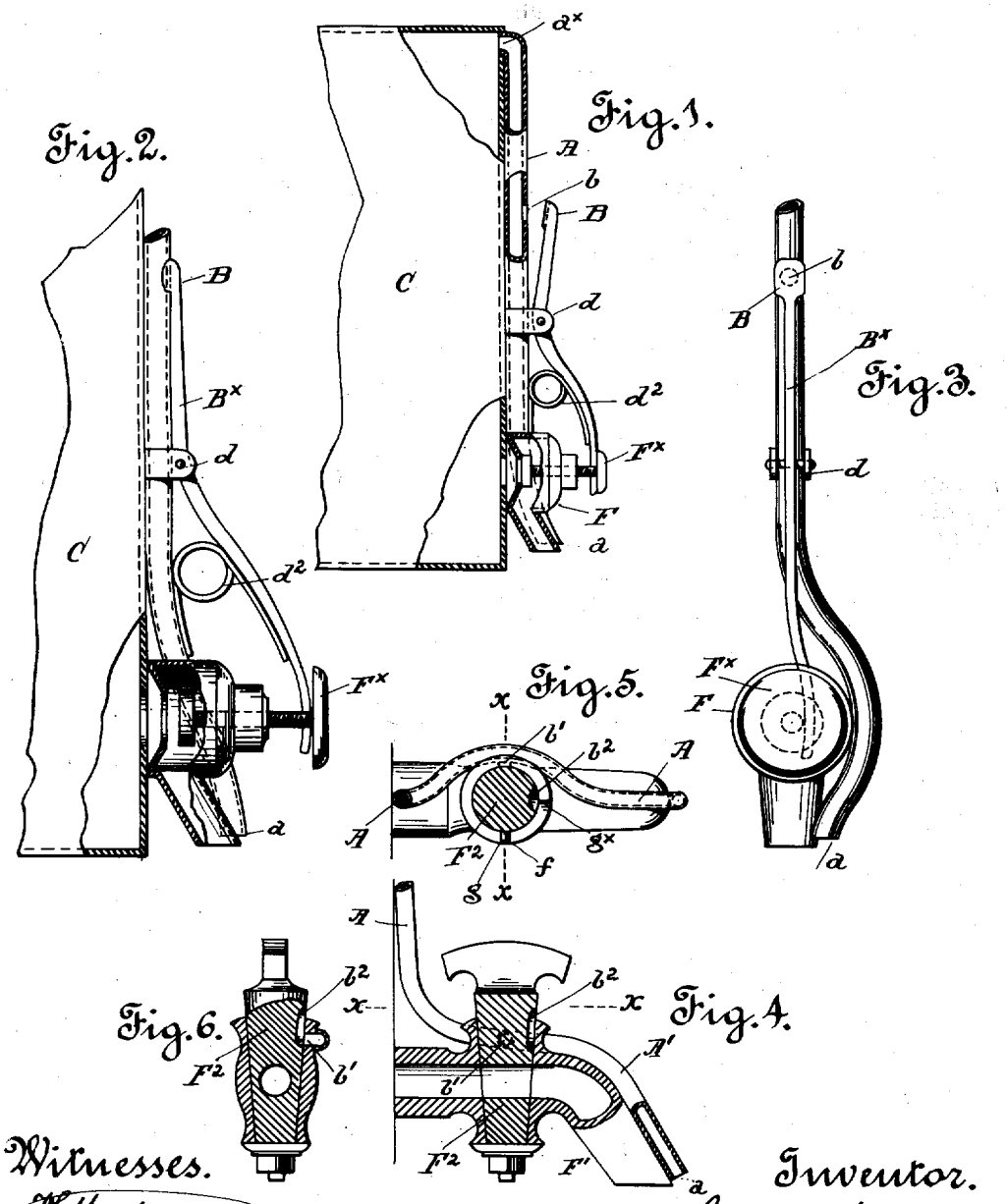
Witnesses.
H. Monteverde.
E. Frank Chaffee
Inventor.
George W. Arper
by M. A. Acker
Atty.

UNITED STATES PATENT OFFICE.

GEORGE W. ARPER, OF OAKLAND, CALIFORNIA.

FAUCET FOR OIL-CANS.

SPECIFICATION forming part of Reissued Letters Patent No. 11,560, dated July 28, 1896.

Original No. 497,398, dated May 16, 1893. Application for reissue filed October 17, 1893. Serial No. 488,433.

*To all whom it may concern:*

Be it known that I, GEORGE W. ARPER, a citizen of the United States, residing in Oakland, in the county of Alameda, State of California, have invented a certain new and useful Improvement in Faucets for Oil-Cans, of which the following is a specification.

My invention relates to improvements in faucets for coal-oil cans and similar packages from which the liquid is to be drawn in larger or smaller quantities, from time to time, into smaller vessels; and the same consists in combining with the drawing-off faucet a vent-tube which extends above the liquid contained within the can or vessel, which vent-tube has a valved aperture provided at some point between its inlet and outlet end, by which air is admitted to the can during the operation of drawing off a portion of the contents into a smaller vessel, but is cut off automatically to stop the outflow of the liquid when the vessel is filled.

The vent-tube shown in the accompanying drawings may run upon the inside of the can or holding-receptacle, or upon the outside thereof, depending upon the style of faucet employed. In the present instance the same is shown as running upon the outside and extending into the can or receptacle above the level of the retained liquid, and I also show the same as having a valved aperture at a point between its inlet end and outlet end.

The object sought to be obtained in the present invention is to clear out the vent-tube at the end of each operation or cause it to discharge whatever liquid is drawn up and remains in the lower end of the vent-tube after the faucet is closed, and which unless removed will act to seal the passage and interfere with the successful operation of the vent-tube.

The following description explains the nature of my said improvements and the manner in which I proceed to apply the same for use both with a compression-faucet of the kind most generally used on coal-oil cans and also with a plug-faucet, the same being represented in the accompanying drawings, forming part of this specification, to which reference is made by letters.

Figure 1 of the drawings represents a coal-oil can with a compression-faucet having my improvement applied to it, the view being a side elevation of the can, with portions shown in section and the body of the faucet broken away to uncover the valve. Fig. 2 is a side view, on an enlarged scale, showing the vent-tube and faucet in section. Fig. 3 is a front view of the faucet, vent-tube, and connected parts shown in Fig. 1. Figs. 4, 5, and 6 represent one mode of applying my improvement to a plug-faucet. In these views, Fig. 4 is a vertical longitudinal section; Fig. 5, a horizontal section taken through the line $x\,x$, Fig. 4; and Fig. 6 is a vertical section on the line $x\,x$, Fig. 5, but with the plug turned in position to close the faucet.

A indicates a continuous vent-passage extending from the space above the liquid in the can down to the end of the spout or nose of a faucet F, by which the contents of the can are drawn off in larger or smaller quantities from time to time in smaller vessels.

C, Figs. 1 and 2, indicates a portion of an ordinary coal-oil can with a compression-faucet F for filling a lamp directly from the can. One opening from the vent-passage is at $a^{\times}$ at the top of this can, and the other end, $a$, is situated at the end of the faucet about on a line with, or just above, the end of the spout or nose. This passage is formed by fixing a tube of small bore either upon the inside or outside of the can and carrying the lower end down along the faucet; or it may be formed directly in the can itself by rolling or bending a continuous tubular passage in the side sheet. In that case a short tube will be carried from the bottom of such passage outward and along the faucet to bring the bottom opening of the passage down to the end of the faucet-spout. As thus arranged air is admitted by the vent-passage into the can, and when the faucet is opened the liquid will continue to flow as long as the lower end $a$ of the vent-passage remains open. But by holding the lamp or vessel to be filled in such position under the faucet that the liquid will cover the end of the vent when the required quantity has been drawn the further flow will be cut off, and if the faucet be closed before the vessel is removed no overflow or waste of liquid will take place. In this operation, however, it will be found that the lower end of the vent-passage retains, or becomes gorged with, the liquid by which it is covered at such time, and the small quantity being held in the passage by atmospheric pressure will stop the vent and prevent its further action when another vessel is to be filled, unless the end of the passage is previously cleared or made to disgorge the liquid. To secure continuous and certain action of the vent-passage therefore I make an air-inlet or opening *b* in the tube A above the point where the passage becomes gorged or choked. This opening I control by a valve B, which is so connected with the valve-stem of the faucet that when the faucet is turned on the opening *b* is closed, but when the faucet is shut the opening is uncovered and the vent-passage is opened to the atmosphere above the open lower end.

Figs. 1, 2, and 3 illustrate the manner in which I control the opening by a compression-faucet. The valve B is set on the upper end of an upright lever $B^{\times}$, working on a pivot *d*, while the lower end of the lever is brought downwardly in a curve to set against the back of the knob or head $F^{\times}$ of the faucet-stem. A spring $d^2$ under the curved arm of the lever holds the lower end against the knob. Suitable movement of the lever is thus obtained as the screw-stem of the faucet is turned in or out to open or close the opening. The first-mentioned position is shown in Fig. 1, where the faucet is closed and the air-inlet opened, and the second position is shown in Fig. 2, where the faucet is open and the opening in the vent-passage closed.

Figs. 4, 5, and 6 show the manner in which I control the relief-opening *b'* in the vent-passage A by a plug-faucet F'. In this construction the aperture *b'* is made in a portion A' of the vent-passage which here extends along the body of the faucet F' at one side of the stem or plug $F^2$, so that the aperture opens through the seat of the stem or plug and a perpendicular port or passage $b^2$ is made in the body of the stem at such point on its circumference that when the stem is set to close the faucet this port comes directly in line with the aperture *b'* and opens it to the atmosphere, but when the plug is turned to draw liquid the port is set away from the aperture and a continuous vent-passage is established from the end of the faucet to the top of the can. The pin *f*, on the stem or plug, and the shoulders *g* $g^{\times}$ on the neck of the faucet are used to limit the rotative movement of the plug and bring it to rest at one or the other of the positions above mentioned.

As thus arranged for operation it will be seen that the tube A forms a continuous vent-passage from the end of the faucet up into the space over the liquid when the faucet is turned on, and, on the other hand, this passage is opened to the atmosphere above the gorging-point by the act of shutting off the flow of liquid at the faucet.

It will be observed from an inspection of the drawings that I provide an uninterrupted air-vent tube or passage, which leads from the end of the faucet up into the space over the liquid retained within the can or vessel. Consequently the can or vessel vents whether the faucet is opened or closed. This is an important feature of my invention, for if the air-vent passage be cut off or closed when the plug of the faucet is turned to cut off the flow of oil, the oil will not flow at once when the faucet is again opened, but will wait until the tube begins to vent freely. By my construction of the vent-tube the oil immediately flows at full force with the opening of the faucet.

Having thus fully described my invention, what I claim as new, and desire to secure by Letters Patent, is—

1. The combination, with an air-tight can or liquid-holder, and a faucet for drawing off the contents thereof, of a vent tube or passage extending from the end of the faucet up into the space over the liquid within the can, said passage having an aperture located at a point above the lower end thereof, and a valve controlled by the stem of the faucet and adapted to close said aperture when the faucet is opened and to open said aperture to admit air into the passage when the faucet is closed, substantially as and for the purpose set forth.

2. The combination, with the faucet F F, of the vent-tube A, having an air-inlet opening between its lower inlet end and its upper end, and a valve adapted to control said inlet and operated by the movement of the stem of the faucet, to close the inlet when the faucet is opened and to open the inlet when the faucet is closed, substantially as and for the purpose set forth.

3. The combination, with an air-tight can having a nozzle, a compression-faucet for closing said nozzle, and a head on the stem of said faucet; of a vent-tube opening at one end into the top of the can and at the other end alongside said nozzle, this tube having an air-inlet between its ends, a lever pivoted between its ends to the can with its lower end behind said head and its upper end opposite said air-inlet, and a spring behind said lever to normally close said air-inlet, as and for the purpose set forth.

4. The combination with an air-tight can or liquid-holder, a faucet for drawing off the contents thereof, a continuous uninterrupted vent-tube extending from the end of the faucet up to and into a space above the level of the retained liquid, so as to admit of a free passage for the air into the can whether the faucet be opened or closed, said vent-tube having a valved aperture at a point between its inlet and outlet end.

In testimony whereof I affix my signature in the presence of two witnesses.

GEORGE W. ARPER.

In presence of—
N. A. ACKER,
LEE D. CRAIG.